United States Patent [19]

Dubin et al.

[11] Patent Number: 5,274,803
[45] Date of Patent: Dec. 28, 1993

[54] METHOD AND APPARATUS FOR ALIGNING A RESTORED PARENT ENVIRONMENT TO ITS CHILD ENVIRONMENTS WITH MINIMAL DATA LOSS

[75] Inventors: Bennett S. Dubin, Los Altos Hills; Peter H. Stevens, Palo Alto, both of Calif.

[73] Assignee: Sun Microsystems, Inc., Mountain View, Calif.

[21] Appl. No.: 692,144

[22] Filed: Apr. 26, 1991

[51] Int. Cl.$^5$ ............................. G06F 13/00
[52] U.S. Cl. ................. 395/600; 364/DIG. 1; 364/283.2; 364/284.4; 364/242.94
[58] Field of Search ............ 364/DIG. 1 MS File, 364/; 395/600, 650

[56] References Cited

U.S. PATENT DOCUMENTS

| | | | |
|---|---|---|---|
| 4,086,628 | 4/1978 | Woodrum | 395/600 |
| 4,468,732 | 8/1984 | Raver | 364/DIG. 1 |
| 4,989,132 | 1/1991 | Mellender et al. | 395/600 |

Primary Examiner—Thomas M. Heckler
Attorney, Agent, or Firm—Blakely Sokoloff Taylor & Zafman

[57] ABSTRACT

A method and apparatus for aligning a restored parent environment to its child environments with minimal data loss is disclosed. The method and apparatus achieve the alignment by re-executing the transactions affecting the objects in the child environments and the revisions of the objects in the parent environment in their order of execution, thereby, allowing the restored parent to further recover loss data from its child environments. The transactions are enhanced to facilitate collection of information regarding the transactions during normal operation, and to adjust their actions during their re-execution based on the information collected. As a result of further data recovery by the restored parent environment, alignment may be achieved with substantially less data loss.

30 Claims, 15 Drawing Sheets

```
fez% nseenv create P /mnt  ⎫
fez% activate P            ⎬ -- 171 jacob@ fez(P)% nsecomp add : Comp a ⎫
jacob@ fez(P)% nsecomp add : Comp b ⎬ -- 172 jacob @ fez(P)% cat >/mnt/firstfile
This is the content of file firstfile.

^D
jacob@ fez (P)% cat > /mnt/secondfile
This is the content of file secondfile.

^D
jacob@ fez (P) % ls - 1 /mnt
total 2
-rw-rw-r--  1 jacob    staff      20 Nov 21 11 : 49 firstfile
-rw-rw-r--  1 jacob    staff      20 Nov 21 11 : 49 secondfile
                                                                -- 173 jacob@ fez (P) % nsecomp add :a:b File /mnt/firstfile
jacob@ fez (P) % nsecomp add :a:b /mnt/secondfile
jacob @ fez (P) % nsecomp list -r
Comp :
     Comp a
     Comp b
     File /mnt/firstfile
     File/mnt/secondfile
                                                                -- 174
```

*Figure 8a*

```
beret% acquire -c C1 -p P@ jacob :
Acquiring:                                                              180
Acquire new:    Var sun4-4.0-nsl
Comp :, revision number 1, created 11/21/89 11:51:44 by jacob.
Acquire new:    Dir /mnt
Acquire new:    File /mnt/firstfile
Acquire new:    File /mnt/secondfile
Acquire new:    Comp      :a:b
Acquire new:    Comp      :a
```

```
bowler% acquire -c C2 -p P@ jacob :
Acquiring:                                                              182
Acquire new:    Var sun4-4.0-nsl
Comp  :, revision number 1, created 11/21/89 11:51:44 by jacob.
Acquire new:    Dir /mnt
Acquire new:    File /mnt/firstfile
Acquire new:    File /mnt/secondfile
Acquire new:    Comp      :a:b
Acquire new:    Comp      :a
```

```
fedora% acquire -c C3 -p P@ jacob :
Acquiring:                                                              184
Acquire new:    Var sun4-4.0-nsl
Comp :, revision number 1, created 11/21/89 11:51:44 by jacob.
Acquire new:    Dir /mnt
Acquire new:    File /mnt/firstfile
Acquire new:    File /mnt/secondfile
Acquire new:    Comp      :a:b
Acquire new:    Comp      :a
```

```
fez% cd `/usr/nse/etc/bpf P`
fez% date                                                               186
Tue Nov 21 11:55:45 PST 1989
fez% tar cvf /backup/P-before_tarfile  .
```

*Figure 8b*

```
beret% activate C1                                          188 alice@beret (C1) % reconcile :a:b
Reconjciling with P@jacob@fez:
Current Comp :a:b Determining what objects to reconcile:
Checking: Comp :a:b Reconcile proceeding
Reconcile update: File /mt/firstfile
Preserve: Comp :a:b Now saving files:
Reconcile done in parent
alice@beret (c1) % exit
```

```
bowler% activate C3                                         190
Betty@lBowler (C3)% resync:
Resyncing
Comp ", revision number 2, created 11/22/89  9:11:04 by Alice.  ⎤
Resync update: File /mnt/firstfile                              ⎬ - 191
Resync update: File/mnt/secondfile                              ⎦

Betty@Bowler (C2)% reconcile :a:b
Reconciling with P@jacob@fez:
Current Comp :a:b Determining what objects to reconcile:  ⎤
Checking: Comp :a:b                     ⎪
                                        ⎪
Reconcile proceeding                    ⎪
Reconcile update: File /mnt/firstfile   ⎬ - 192
Preserve: Comp :a:b                     ⎪
                                        ⎪
Now saving files:                       ⎪
Reconcile done in parent                ⎪
Betty@Bowler (C2)% exit                 ⎦
```

*Figure 8c-1*

```
stetson% acquire -c C4 -p P@jacob :                          194
Acquiring:
Acquire new:  Var sun4-4.0-nsl
Comp ", revision number@, created 11/22/89 1:31:24 by Betty
Acquire new:  Dir /mnt
Acquire new:  File /mnt/firstfile
Acquire new:  File /mnt/secondfile
Acquire new:  Comp :a:b
Acquire new:  Comp :a
```

```
fedora% activate C3                                          196
charles@fedora (C3)% resync :
Resyncing:
Comp :, revision number 3, created 11/22/89 1:31:24 by Betty
Resync update:  File /mnt/firstfile
Resync update:  File /mnt/seconfile
charles@fedora (C3)% exit
```

*Figure 8c-2*

```
fez% date                                                    198
Wed Nov 22 4:51:44 PST 1989
fez% pwd
/tmp_mnt/nser/br.2569a674.21e.81902a26
fez% tar xvf /backup/P-before_tarfile
```

```
fez% ;identify -s /tmp/cmd_data -v P@Nse 11/22/89 5:11:04 ]-- 201 fez% cat /tmp/cmd_data
                                                             200
c1@alice@beret - "reconcile :a:b"
   [originally done 11/11/89 9:11:04]
   [exit status: 0]

c2@betty@bowler - "resync :a:b"
   [originally done 11/22/89 12:11:14]
   [exit status: 0]

c2@gbetty@bowler - "reconcile :a:b"
   [originally dne 11/22/89 1:31:24]        -- 202
   [exit status: 0]

c4daniel@stetson - "acquire :"
   [originally donhe 11/22/89 2:21:14]
   [exit status: 0]

c3@charles@fedora - "resync :a:b"
   [originally done 11/22/89 3:34:19]
   [exit status: 0]
```

*Figure 8d*

```
fez% activate C1@alice                                           204
jacob@fez (C1@alice) % reconcile :a:b
Reconciling with P@jacob@fez:
Current Comp :a:b Determining what objects to reconcile:                        ⎤
Checking: Comp :a:b                                           |
The following objects have changed in environment "P@jacob@fez"
        and must be resynced:                                 |
File /mnt/firstfile                                           ⎬ 205
Resync will be done.  The command is:                         |
resync :a:b                                                   |
Resyncing:                                                    |
Comp :a:b, revision number 1, created 11/21/89 11:51:44 by jacob.
Resync conflict: File /mnt/firsttfile                         ⎦
Warning: there was 1 resync conflict. Use "resolve" to resolve it.

jacob@fez (C1@alice) % merged -p                              ⎤
The following objects require contents merging:               |
File /mnt/firstfile                                           ⎬ 206
jacob@fez (C1@alice) % merged -t File /mnt/firstfile          |
jacob@fez (C1@alice) % merged -p                              ⎦ jacob@fez (C1@alice) % reconcile :a:b                         ⎤
Reconciling with P@jacob@fez:                                 |
Current Comp :a:b                                             |
                                                              |
Determining what objects to reconcile:                        |
Checking: Comp :a:b                                           ⎬ 207
                                                              |
Reconcile proceeding                                          |
Reconcile update: File /mnt/firstfile                         |
Preserve: Comp :a:b                                           |
                                                              |
Now saving files:                                             ⎦
Reconcile done in parent
```

*Figure 8e-1*

```
fez% activate C2@Betty                                              208
jacob@fez (C2@Betty) % resync :                        ⎫
Resyncing:                                             ⎪
Comp :, revision number 2, created 11/22/89 9:11:04 by Alice ⎬ - 209
Resync update: File /mnt/firstfile                     ⎪
Resync update: File /mnt/seconfile                     ⎭
            •
            •
```

```
stetson% acquire -c c4 -p P@jacob :                                 210
Acquiring:
Acquire new: Var sun4-4.0-nsl
Comp :, revision number@, created 11/22/89 1:31:24 by Betty
Acquire new: Dir /mnt
Acquire new: File /mnt/firstfile
Acquire new: File /mnt/secondfile
Acquire new: Comp :a:b
Acquire new: Comp :a
```

*Figure 8e-2*

METHOD AND APPARATUS FOR ALIGNING A RESTORED PARENT ENVIRONMENT TO ITS CHILD ENVIRONMENTS WITH MINIMAL DATA LOSS

BACKGROUND OF THE INVENTION

1. Field of the Invention

The present invention is related to the field of computer systems. More particularly, the present invention is a method and apparatus for aligning a restored parent environment to its child environments with minimal data loss.

2. Art Background

Today, many computer systems offer support for hierarchies of inter-related environments for software development. For example, the Network Software Environment (NSE) supported on the SUN microsystems manufactured by SUN Microsystems, Inc., Mountain View, Calif. An environment 20 or 21 is a named envelope of a collection of objects 24, 26 or 25, 27 (FIG. 1a). Typically, the objects are organized under a directory 22 or 23. An environment 20 or 21 may be created on any machine 12, 14, 16 or 18 in a network of computers 10. An object 24, 25, 26 or 27 is a named data container. An object 24, 25, 26 or 27 may be a simple object 26 or 27 or a compound object 24 or 25. A simple object 26 or 27, is an object that does not contain other objects, for example, a source file. A compound object 24 or 25 is a list of other objects, including other compound objects, for example, a component containing a list of its source files. The objects 24, 25, 26, 27 of an environment 20, 21 may be physically located on any machine 12, 14, 16 or 18 in the network of computers 10.

Typically, environments 31-36 are logically organized into an hierarchy 30 (FIG. 1b). For example, a software development project may comprise a grandparent release environment 31 for holding the various revisions of the project 40 that have been released to the customers, a plurality of parent integration environments 32, 33, each holding the latest revisions of component 41 or 42 of the project, and a plurality of child development environments 34, 35, 36, each holding the latest editions of various subcomponents 43-46 being modified by the individual developers.

A developer who wish to modify an object acquires a new edition of the object 52 or 53 into the child environment from the latest revision of the object 51 in the parent environment (FIG. 2). After modifying the new edition of the object 52 or 53 in the child environment, the latest revision of the object 51 or 56 in the parent environment is reconciled to the modified edition of the object 54 or 55 in the child environment. If the latest revision of the object 51 in the parent environment is the same revision of the object 51 in the parent environment previously acquired for the modified edition of the object 54 in the child environment, the reconciliation process is successful, resulting in a new latest revision of the object 56 being made in the parent environment.

If the latest revision of the object 56 in the parent environment is not the same revision of the object 51 in the parent environment previously acquired for the modified edition of the object 55 in the child environment, the reconciliation process is unsuccessful, resulting in the initiation of the resynchronization process and acquisition of a new edition of the object 57 into the child environment from the new latest revision of the object 56 in the parent environment. After resolving the differences between the modified edition of the object 55 and the acquired new edition of the object 57, the latest revision of the object 56 in the parent environment is reconciled again to the consolidated edition of the object 58 in the child environment. Since the latest revision of the object 56 in the parent environment has remained unchanged, the reconciliation process is successful, resulting in another new latest revision of the object 59 being made in the parent environment.

For the environments to work cooperatively with each other, each environment contains a plurality of internal files (not shown in FIGS. 1a, 1b and 2) for keeping track of status and attribute information regarding the objects. Thus, consistency between these internal files must be maintained, in order for the environment hierarchy to work properly. The environments are said to be aligned if consistency is maintained.

Ideally, these environments are all backed up at the same time, when they are all quiescent. But, in practice, particularly for large software development projects, it is often impossible to do so. The environments tend to be backed up at different times. Furthermore, other environments tend to be active when a quiescent environment is being backed up. Therefore, when damages occur to one or more of the environments, restoration of the damaged environments, and aligning the restored environments to the other environments, without substantial data loss, becomes a problem.

The problem tends to be more tolerable if the damages are confined to the leaf environments. A leaf environment is a child environment that is not a parent environment to other child environments. Typically, a damaged leaf environment is restored to its last back up. Since after the restoration, all objects in a restored leaf environment would be older in time than their corresponding revisions in the parent environment, the restored leaf environment is automatically in alignment with its parent environment. Changes previously made to objects in the restored leaf environment, from the time the restored leaf environment was last backed up to the time the restored leaf environment was damaged, are lost, unless the prior changes can be recovered from the parent environment. Such changes are recoverable, only if the corresponding revisions in the parent environment were previously reconciled to the objects in the restored leaf environment, between the time the restored leaf environment was last backed up and the time the restored leaf environment was damaged.

The problem is a lot less tolerable when damages are not confined to the leaf environments. After a non-leaf environment is restored, since the objects in the child environments to the restored non-leaf environment would be younger than the corresponding revisions in the restored non-leaf environment, the restored non-leaf environment is most likely no longer in alignment with its child environments. To return the environment hierarchy into alignment, all the child environments to the restored non-leaf environment has to be restored to previous back up times that are older than the back up time of the damaged non-leaf environment being restored to. Similarly, if the restored child environments themselves are parent environments to other child environments (grand-child environment to the damaged non-leaf environment), these other child environments (grand-child environment to the damaged non-leaf environment) also have to be restored to previous back up times that are older than the corresponding back up times of their parent environments (child environments to the damaged environment). Although similar to restoring a leaf environment, for those objects in a child environment whose corresponding revisions in their parent environment have been previously reconciled, between the time the restored child environment was backed up and the time the restored parent environment was backed up, prior changes made to these objects between these times are recoverable; nevertheless, the amount of data loss could be substantial, due to the multiplying effect for each layer of the environment hierarchy that has to be restored.

SUMMARY OF THE INVENTION

It is therefore an object of the present invention to a align a restored parent environment to its child environments with minimal data loss.

The method of the present invention comprises the steps of logging all transactions affecting revisions of objects in the parent environment and their corresponding objects in the child environments when the transactions are executed; identifying the transactions logged between a first time $t_0$ and second time $t_1$ where time $t_0$ is the last back up time the parent environment is being restored to, time $t_1$ is the time the parent environment is damaged, and time $t_1$ is greater than time $t_0$; sorting the identified transactions into a chronological order in accordance to their time of execution; and performing remedial action for each of the sorted transactions in the chronological order.

The apparatus of the present invention comprises transaction procedures for acquiring a revision of an object from the parent environment into one of the child environments, resynchronizing an object in one of the child environments to a corresponding revision of the object in the parent environment, reconciling a revision of an object in the parent environment to the object in one of the child environments, these transaction procedures being invoked by users of the child environments, and capable of being re-executed in accordance to their original order of execution for aligning the parent and child environments; a logging procedure for logging these transactions when they are executed, the logging procedures invoked by the transactions; an identifying procedure for identifying the transactions occurred between time $t_0$ and time $t_1$, the identifying procedure being invoked by a user of the restored parent environment; and a sorting procedure for sorting the identified transactions into a chronological order in accordance to their time of execution, the sorting procedure invoked by the identifying procedure.

BRIEF DESCRIPTION OF THE DRAWINGS

The object, features and advantages of the present invention will be apparent from the following detailed description of the preferred embodiment of the invention with references to the drawings in which:

FIGS. 8a, 8b, 8c-1, 8c-2, 8d, 8e-1, 8e-2 show various diagrams illustrating an exemplary application of the present invention.

NOTATIONS AND NOMENCLATURE

Figure 1A:
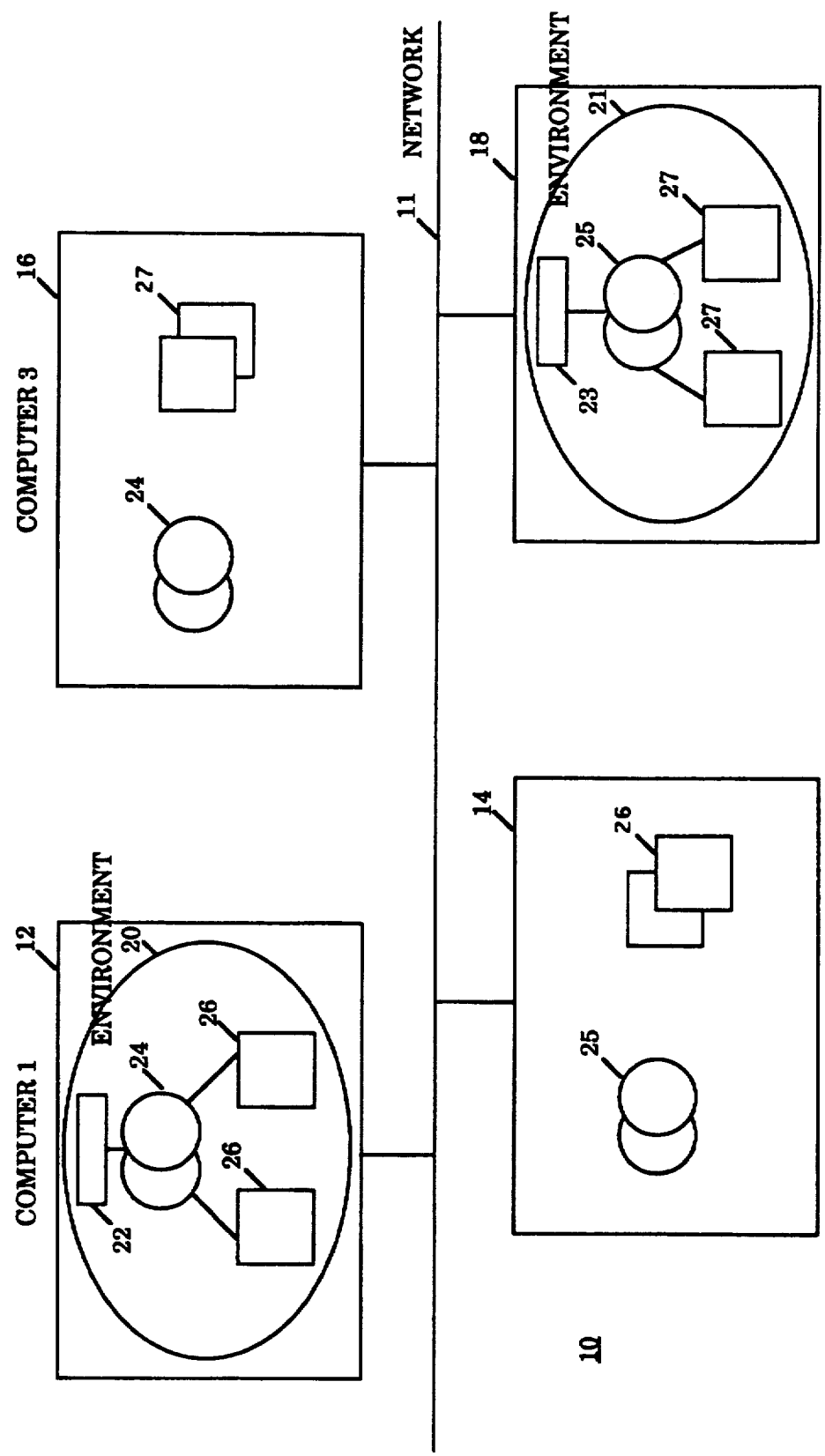
FIGS. 1a & 1b show block diagrams illustrating a physical view and a logical view of the inter-related development environments of the prior art.

The detailed description which follows is presented largely in terms of program procedures executed on a network of computers. This procedural descriptions and representations are the means used by those skilled in the art to most effectively convey the substance of their work to others skilled in the art.

A procedure is here, and generally, conceived to be a self-consistent sequence of steps leading to a desired result. These steps are those that require physical manipulations of physical quantities. Usually, though not necessarily, these quantities take the form of electrical or magnetic signals capable of being stored, transferred, combined, compared, and otherwise manipulated. It proves convenient at times, principally for reasons of common usage, to refer to these signals as bits, values, elements, symbols, objects, characters, terms, numbers, or the like. It should be borne in mind, however, that all these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary, or desirable in most cases, in any of the operation described herein which form part of the present invention; the operations are machine operations. Useful machines for performing the operations of the present invention include general purpose digital computers or other similar devices. In all cases, it should be borne in mind that the distinction between the method operations in operating a computer and the method of computation itself. The present invention relates to method steps for operating a computer in processing electrical or other physical signals to generate other desired physical signals.

The present invention also relates to apparatus for performing these operations. This apparatus may be specially constructed for the required purposes or it may comprise a general purpose computer as selectively activated or re-configured by a computer program stored in the computer. The procedures presented herein are not entirely related to any particular computer or other apparatus. In particular, various general purpose machines may be used with procedures written in accordance with the teaching herein, or it may prove more convenient to construct more specialized apparatus to perform the required method steps. The required structure for a variety of these machines will appear from the description given below.

DETAILED DESCRIPTION OF THE INVENTION

A method and apparatus for aligning a restored parent environment and its child environments is disclosed. In the following description for purposes of explanation, specific numbers, materials and configurations are set forth in order to provide a thorough understanding of the present invention. However, it will be apparent to one skilled in the art that the present invention may be practiced without the specific details. In other instances, well known systems are shown in diagrammatical or block diagram form in order not to obscure the present invention unnecessarily.

Figure 3:
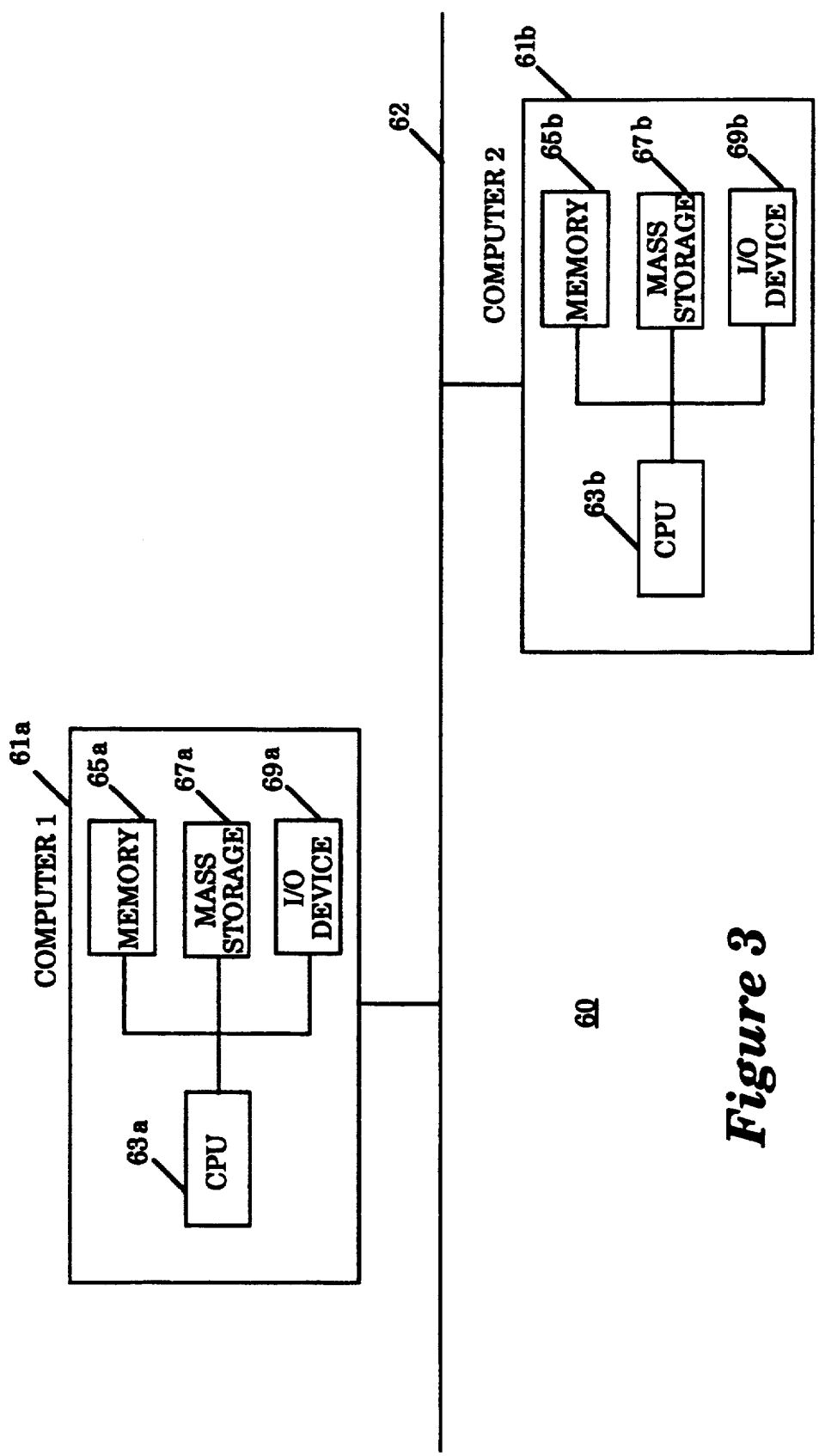
FIG. 3 shows a block diagram illustrating a physical view of a network of computer systems employed by the present invention organized by the hardware elements.

Referring now to FIG. 3, a block diagram illustrating a physical view of a network of computer systems used by the present invention organized by its hardware element is shown. The network of computer systems 60 comprises at least one computer system 61a or 61b. If more than one computer system 61a, 61b are employed, the computer systems 61a, 61b are coupled to each other through a network 62. Each computer system 61a or 61b comprises a central processing unit (CPU) 63a or 63b, a memory unit 65a or 65b, a mass storage unit 67a or 67b and an input/output (I/O) device 69a or 69b. The characteristics of these hardware elements on each of the computer systems 61a or 61b, such as speed, size, may differ from each other. These hardware elements are those typically found in most general purpose computer systems and almost all special purpose computer systems. In fact, the several hardware elements contained within each of the computer system 61a or 61b are intended to be representative of this broad category of data processing systems. Particular examples of suitable data processing systems to fill the role of these computer systems 61a, 61b include computer systems manufactured by Sun Microsystems, Inc., Mountain View, Calif. Other computer systems having like capabilities may of course be adapted in a straight forward manner to perform the functions described below.

Figure 4:
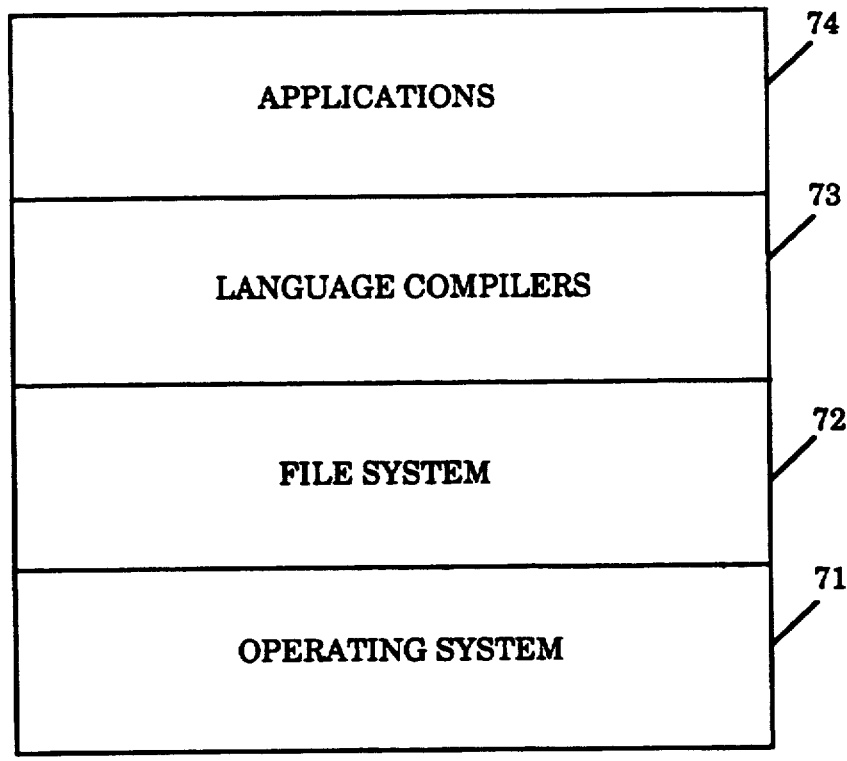
FIG. 4 shows a block diagram illustrating a logical view of a typical computer system employed by the present invention organized by the system software.

Referring now to FIG. 4, a block diagram illustrating a logical view of a typical computer system used by the present invention organized by its system software is shown. The system software 70 comprises an operating system 71, a file system 72, and at least one language compiler 73. The applications 74 executing on the computer system 70 utilize the underlying system services offered by the system software 71-73. The system software used on each of the computer system may be different provided they offer equivalent functions and capable of communicating with each other. These software elements are those typically found in most general purpose computer systems and almost all special purpose computer systems. In fact, the several software elements contained within each of the computer system are intended to be representative of this broad category of system software. Particular examples of suitable system software to fill the role of these system software 70 of the computer systems used by the present invention include the UNIX operating system, its file system and its Shell command language (UNIX is a registered trademark of AT&T). Other system software having like capabilities may of course be adapted in a straight forward manner to perform the functions described below.

Figure 5:
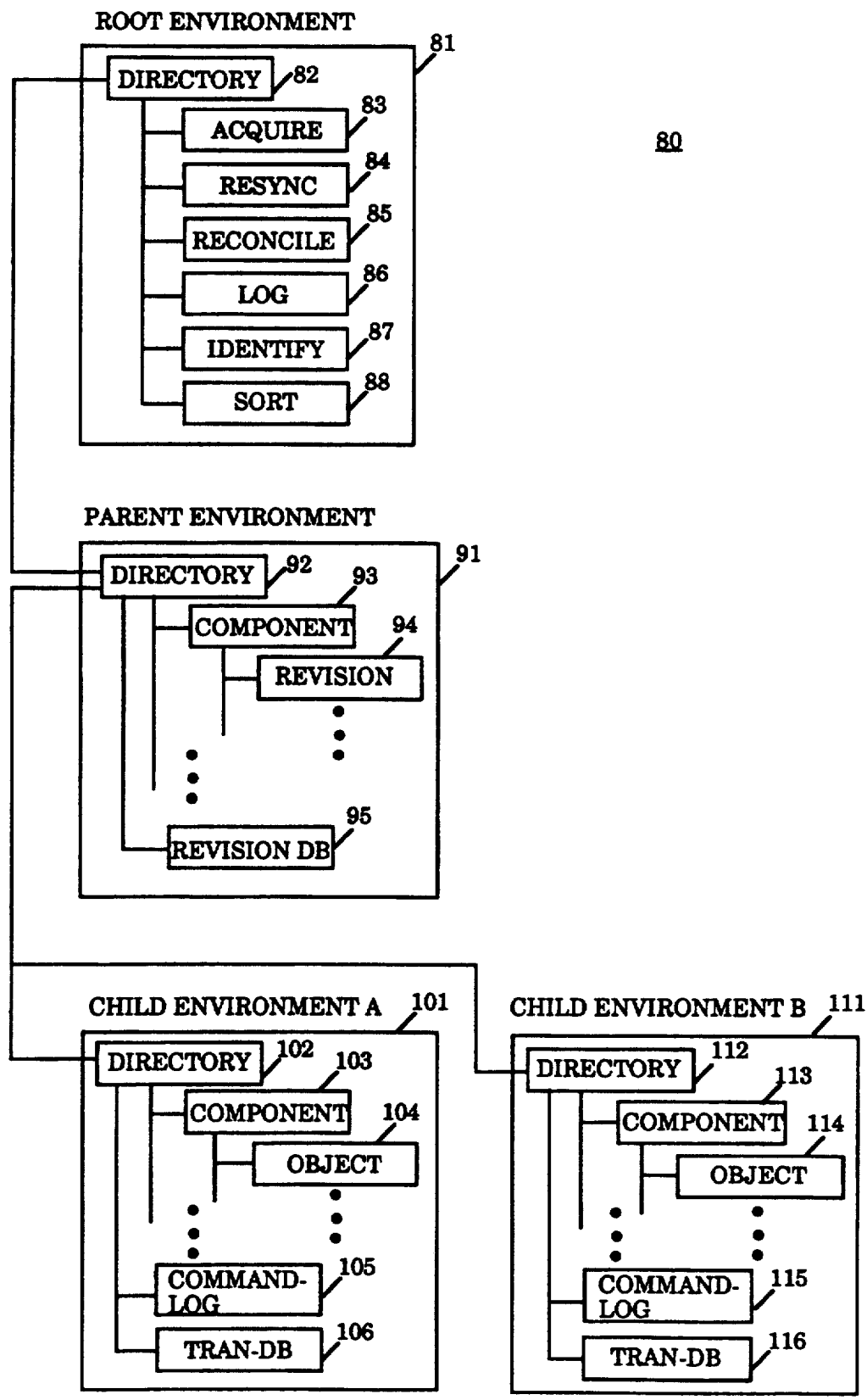
FIG. 5 shows a block diagram illustrating a logical view of the apparatus of the present invention organized as a class hierarchy.

Referring now to FIG. 5, a block diagram illustrating a logical view of the apparatus of the present invention organized as a class hierarchy is shown. In the realm of object oriented programming, an object is an entity comprising data and operations which can be invoked to manipulate the data. Object users manipulate the data by invoking the operations. Objects are organized as class instances and classes. The data are contained in the class variables and/or the class instance variables. The operations that can be invoked to manipulate the data are defined in the methods of the class. Additionally, these classes and a root class are ordered into a hierarchy. Each class, except the root class, is subclassed to at least one of the other classes with the subclass inheriting the class methods, class instance variables and class variables of the other classes. The other classes are also referred as the super classes of the subclass. For further descriptions on object-oriented design and programming techniques, see B. Meyer, *Object-oriented Software Construction*, (Prentice Hall, 1988), pp. 65-382.

The apparatus of the present invention 80 comprises a plurality of procedures 83 through 88 being executed, and a plurality of directories 82, 92, 102, 112, files 105, 115, and databases 95, 106, 116 being stored, on the network of computer systems comprising the system software described above. The procedures 83 through 88, in conjunction with the directories 82, 92, 102, 112, files 105, 115, and databases 95, 106, 116 allow a restored parent environment to be aligned to its child environments with minimal data lost.

The procedures comprise an acquire procedure 83, a resync procedure 84, a reconcile procedure 85, a log procedure 86, an indentify procedure 87 and a sort procedure 88. These procedures 83 through 88 are logically organized as methods of a root class 81 defining a root environment having at least one subclass 91 defining at least one parent environment. The directories, files, and databases comprise at least one directory 82, 92, 102, or 112, one for each environment, at least one revision database 95, one for each parent environment, at least one command log file 105, 115, one for each child environment, and at least one transaction database 106, 116, one for each child environment. The directories 82, 92, 102, 112 are logically organized as the class directories of the classes 81, 91, 101, 111 defining the environments. The files 105, 115, and databases 95, 106, 116 are logically organized as class instance variables of the classes/subclasses 91, 101, 111 defining the parent and child environments. For further descriptions on implementing a class hierarchy of objects in a hierarchical file system, see U.S. patent application, Ser. No. 07/681,071 filed on Apr. 5, 1991, entitled *Method and Apparatus for implementing a class hierarchy of objects in a hierarchical file system*, by Owen M. Densmore and David S. H. Rosenthal, assigned to the assignee of the present invention, Sun Microsystems Inc., Mountain View, Calif.

The acquire procedure 83 is for a child environment 101 or 111 to acquire an object 104 or 114 based on the lastest revision of the object 94 in the child's parent environment 91, during normal operation. The acquire procedure 83 is also for a child environment 101 or 111 to re-acquire an object 104 or 114 based on the latest revision of the object 94 in the child's restored parent environment 91, when the restored parent environment 91 is being aligned with its child environments 101, 111. If the child environment 101 or 111 is created after the last backup, the parent environment 91 being restored to the acquire procedure 83 is re-executed for re-acquiring an object 104 or 114, after the previously acquired object 104 or 114 is first deleted from the child environment 101 or 111. The previously acquired object 104 or 114 is deleted from the child environment 101 or 111, even the child environment 101 or 111 is not damaged.

The acquire procedure 83 functions in substantially the same manner as the prior art. Additionally, the acquire procedure 83 invokes the log procedure 86 to update the appropriate files/databases 95, 105, 106, 115, 116 in the parent and child environments 91, 101, 111, regarding the acquire procedure 83 being executed for the parent and child environments 91, 101, 111. Updating the files/databases 95, 105, 106, 115, 116 will be discussed in further detail later. When the acquire procedure 83 is re-executed for re-acquiring a latest revision of an object 94 from a restored parent environment 91, the acquire procedure 83 updates the re-acquiring child environment 101 or 111 handling the latest revision 94 being re-acquired as a normal latest revision being acquired from the restored parent environment 91 during normal operation.

The resync procedure 84 is for resynchronizing an object 104 or 114 in a child environment 101 or 111 to the latest revision of the object 94 in the child's parent environment 91, during normal operation. Similarly, the resync procedure 84 is also for re-synchronizing an object 104 or 114 in a child environment 101 or 111 to the latest revision of the object 94 in the child's restored parent environment 91, when the restored parent environment 91 is being aligned with its child environments 101, 111.

Likewise, the resync procedure 84 functions in substantially the same manner as the prior art. Additionally, the resync procedure 84 also invokes the log procedure 86 to update the appropriate files/database 95, 105, 106, 115, 116 in the parent and child environments 91, 101, 111, regrading the resync procedure 84 being executed for the parent and child environments 91, 101, 111. Using the files/databases 95, 105, 106, 115, 116 will be discussed in further detail later. When the resync procedure 84 is re-executed for re-resynchronizing an object 104 or 114 of a child environment 101 and 111 to the latest revision of the object 94 in the child's restored parent environment 91, the resync procedure 84 updates the re-resynchronizing child environment 101 or 111 handling the object 104 or 114 being resynchronized as a normal object being resynchronized in the re-resynchronizing child environment 101 or 111 during normal operation.

The reconcile procedure 85 is for reconciling a latest revision of an object 94 in a parent environment 91 to the object 104 or 114 in one of the parent's child environment 101 or 111, during normal operation. The reconcile procedure 85 is also for re-reconciling a latest revision of an object 94 in a restored parent environment 91 to the object 104 and 114 in one of the restored parent's child environment 101 or 111, when the restored parent environment is being aligned with its child environments 101 and 111.

Similarly, the reconcile procedure 85 functions in substantially the same manner as the prior art. Additionally, the reconcile procedure 85 invokes the log procedure 86 to update the appropriate files/databases 95, 105, 106, 115, 116 in the parent and child environments 91, 101, 111, regarding the reconcile procedure 85 being executed from the parent and child environments 91, 101, 111. Using the files/databases 95, 105, 106, 115, 116 will be discussed in further detail later. When the reconcile procedure 85 is re-executed for re-reconciling a latest revision of an object 94 of a restore parent environment 91 to the object 104 and 114 in one of the restored parent's child environment 101 or 111, the reconcile procedure 85 handles the object 104 or 114 in the child environment 101 or 111 in accordance to a plurality of timing parameters extracted for the latest revision 94 and the object 104 or 114 being re-reconciled to, from the directories 92, 102, 112, files/databases 95, 105 or 115, 106 or 116 of the parent and child environments 91, 101, 111.

The reconcile procedure 85 extracts the time the object being reconciled to was made from the directory structure 102 or 112 of the child environment 101 or 111, the time the object being reconciled to was last involved in an transaction between the parent and the child environments 91, 101, 111 from the transaction database 106 or 116 of the child environment 101 or 111, and the time the latest revision being reconciled was made from the revision database 95 of the parent environment 91. The directory structure 102 or 112, the transaction database 106, 116 and the revision database 95 will be discussed in further detail later.

If the time the object being reconciled to was made, equals the time the object being reconciled to was last involved in an transaction between the parent and the child environments, and equals a non-zero value, furthermore, the time the latest revision being reconciled was made, equals a value zero, the reconcile procedure 85 resets the object being reconciled to 104 or 114, and updates the restored parent environment 91 handling the object being reconciled to 104 or 114 as a normal new object being reconciled to in the child environment 101 and 111.

If the time the object being reconciled to was made, equals the time the object being reconciled to was last involved in an transaction between the parent and the child environments, and equals a non-zero value, furthermore, the time the latest revision being reconciled was made, equals a lesser non-zero value, the reconcile procedure 85 outputs a flag indicating a conflict and requires the conflict to be resolved before updating the restored parent environment 91 handling the object being reconciled to 104 or 114 as a normal old object being reconciled to in the child environment 101 and 111.

If the time the object reconciled to was made, equals a non-zero value, the time the object being reconciled to was last involved in an transaction between the parent and the child environments, and the time the latest revision being reconciled was made, equal a value zero, the reconcile procedure 85 updates the restored parent environment 91 handling the object being reconciled to 104 and 114 as a normal new object being reconciled to in the child environment 101 or 111.

If the time the object being reconciled to was made, equals the time the object being reconciled to was last involved in an transaction between the parent and the child environments, and the time the latest revision being reconciled was made, and equals a non-zero value, the reconcile procedure 85 takes no action.

The log procedure 86 if for updating the appropriate files/databases 95, 105, 106, 115, 116 regarding all transactions affecting revision of objects 94 in the parent environment 91 and the objects 104, 111 in the child environments 101, 111, when the transactions are executed. As described earlier, the log procedure 86 is invoked by the acquire 83, the resync 84 and the reconcile 85 procedures. Upon invocation, the log procedure 86 logs the information regarding the particular transaction between the parent 91 and the child environment 101 and 111 into the command log file 105 or 115 in the child environment 101 and 111. Additionally, the log procedure 86 updates the transaction database 106 and 116 in the child environment 101 and 111 to reflect the particular transaction as the latest transaction for the object 101 or 114. Furthermore, in the invoking transaction is a reconcile procedure 85, the log procedure 86 also logs the making of the latest revision for the object 84 in the revision database 95 in the parent environment 91. The revision database 95, the command log files 105, 115, and the transaction databases 106, 116 will be discussed in further detail later.

The identify procedure 87 is for identifying the transactions occurred between the parent 91 and its child environments 101, 111 during a particular time period. The relevant time period is the time period between the last back up time the parent environment 91 is being restored to and the time the parent environment 91 was damaged. The identify procedure 87 scans the command log files 105, 115 in all the child environments 101, 111, and extracts the logged transactions that occurred between the parent 91 and child environments 101, 111, during the relevant time period.

The sort procedure 88 is for sorting the identified transaction into a chronological order in accordance to their time of execution. The sort procedure 88 receives the identified transactions as inputs and outputs them in a sorted order. Preferably, the sort procedure 88 is invoked by the identify procedure 87 automatically.

Figure 6:
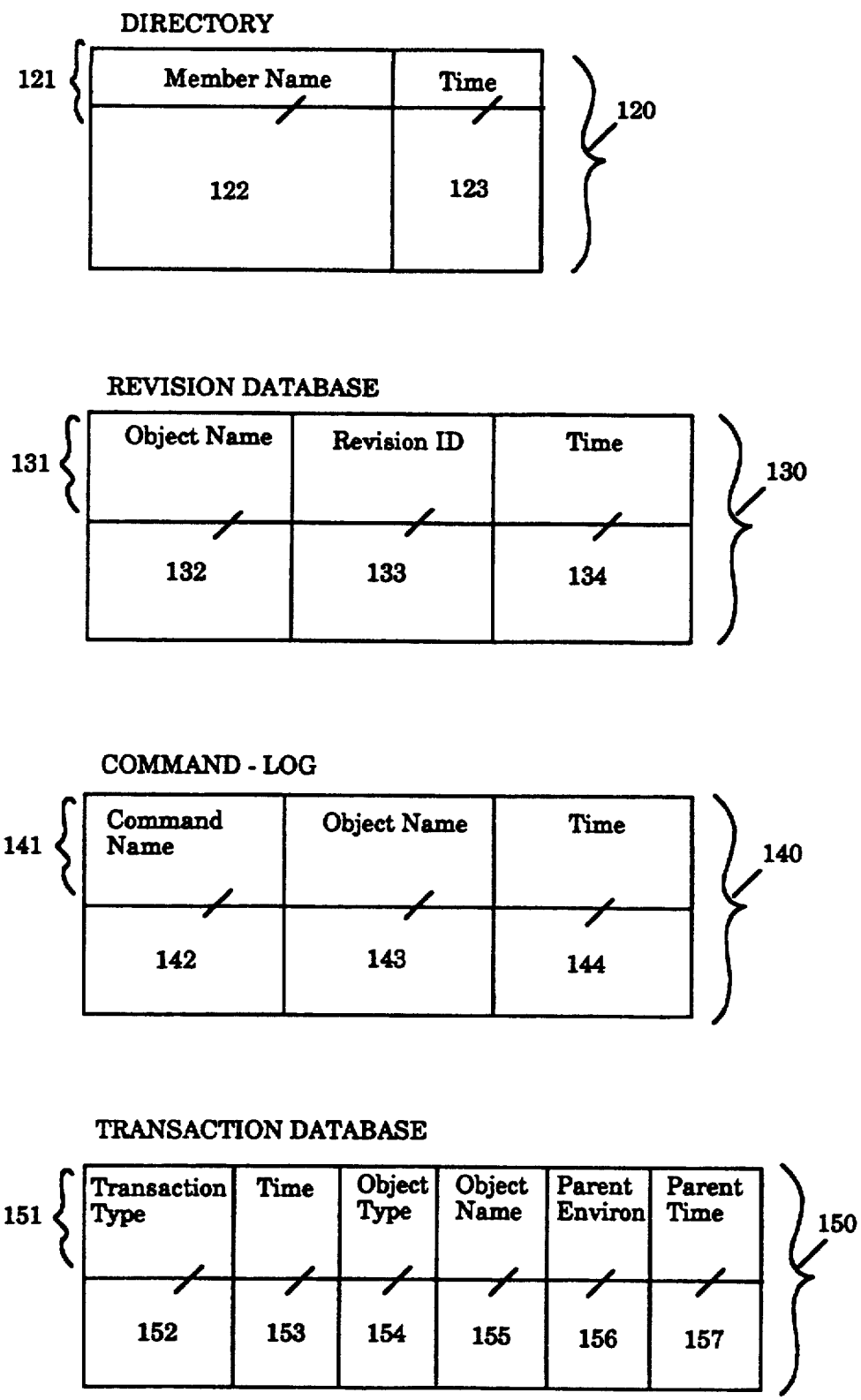
FIG. 6 shows a block diagram illustrating a logical view of the directories, files and databased used by the present invention.

Referring now to FIG. 6, a block diagram illustrating a logical view of the directories, files and databases used by the present invention is shown. As described earlier, the directories 120 are used to described a class or subclass defining an environment. The directories 120 are updated by the file system as members of the directories 120 are created, updated and deleted. Each directory 120 comprises a plurality of records 121 describing the members of the directory defining the class instance variables of the class. Each record 121 comprises a member name field 122 and a time field 123. The member name field 122 identifies the member. The time 123 records the time the member was made.

The revision database 130 are used for recording the time the revisions of objects in the parent environment are made. As described earlier, the revision databases 130 are caused to be updated by the transaction procedures. A revision database 130 is created in each parent environment. A revision database 130 comprises a plurality of revision records 131 describing the makings of revisions of objects. Each revision record 131 comprises an object name field 132, a revision identifier field 133 and a time field 134. The object name field 132 is for recording the name of the object whose latest revision is being made in the parent environment. The revision identifier field 133 is for recording the revision level. The time field 134 is for recording the time the latest revision of the object was made.

The command log files 140 are used for recording the transactions between the parent and child environments. As described earlier, the command log files 140 are caused to be updated by the transaction procedures. Each command log file 140 comprises a plurality of records 141 describing the transactions being logged. Each record 141 comprises a command name field 142, an object name field 143 and a time field 144. The command name field 142 records the procedure involved, i.e. acquire, resync or reconcile. The object name field 143 record the object in the child environment involved in the transaction. The time field 144 records the time the procedure was executed.

The transaction databases 150 are used to record the last transactions of objects in the child environments with their parent environments. As described earlier, the transaction databases 150 are caused to be updated by the transaction procedures. Each transaction databases 150 comprises a plurality of records 151 describing the last transaction for an object in the child environment with its parent environment. Each record 151 comprises a transaction type field 152, a time field 153, an object type field 154, an object name field 155, a parent environment filed 156 and a parent time field 157. The transaction type field 152 records the procedure executed, i.e. acquire, resync or reconcile. The time field 153 records the time the procedure was executed. The object type field 154 identifies the object type of the object involved in the transaction. The object name field 155 identifies the object involved in the transaction. The parent environment field 156 identifies the parent environment involved in the transaction. The parent time field 157 identifies the time of the revision in the parent environment involved in the transaction was made.

Figure 7:
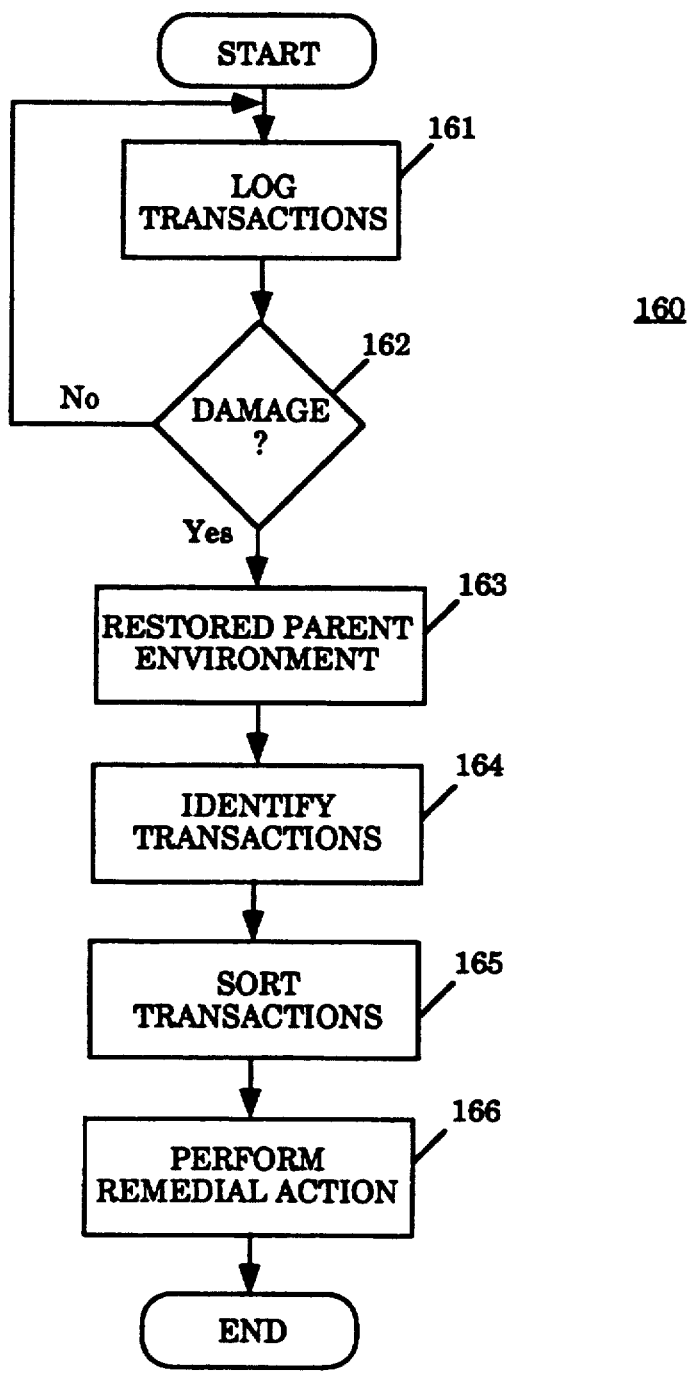
FIG. 7 shows a block diagram illustrating the method of the present invention.

Referring now to FIG. 7, a block diagram illustrating the method of the present invention is shown. Initially, the apparatus of the present invention is used to log all the relevant information regarding the transactions between the parent and its child environments 161. When a parent environment is damaged, 162, the parent environment is first restore to its last back up 163. Then, the transactions between the restored parent and its child environments between the time of the parent's last back up and the time the parent was damaged 164 are identified. After sorting the identified transactions into a chronological order according to their time of execution 165, remedial action is performed for each of the identified transactions in the order they were executed 166.

Referring now to FIGS. 8a, 8b, 8c-1, 8c-2, 8d, 8e-1, 8e-2, various diagrams illustrating an exemplary application of the method and apparatus of the present invention are shown. In this exemplary application, an administrator Jacob creates a parent environment named P. Developers Alice, Betty and Charles create three child environments C1, C2, and C3 respectively, and do work in them. Jacob then performs back up of all the environments. Developer Daniel then creates another child environment C4, and the other developers do additional work in the other child environments. The parent environment is then damaged and restored to its last back up time. The exemplary application shows how Jacob aligns the restored parent environment to its child environment, applying the method and apparatus of the present invention.

Referring first to FIG. 8a, Jacob creates the parent environment P 171. He then populates the parent environment P with two compound objects, components ":a", and ":a:b" 172. He then creates two simple objects, files "firstfile" and "secondfile" 173, and places them under the compound object component ":a:b" 174.

Referring now to FIG. 8b, after creating the child environment C1 on her machine "beret", Alice acquires the latest revisions of all objects in the parent environment P 180, thereby, acquiring the compound objects, components ":a", ":a:b", and the simple objects, files "firstfile" and "secondfile". Similarly, after creating the child environment C2 on her machine "bowler", Betty acquires the latest revisions of all objects in the parent environment P 182, thereby, acquiring the compound objects, components ":a", ":a:b", and the simple objects, files "firstfile" and "secondfile". Likewise, after creating the child environment C3 on his machine "fedora", Charles acquires the latest revisions of all objects in the parent environment P 182, thereby, acquiring the compound objects, components ":a", ":a:b", and the simple objects, files "firstfile" and "secondfile". In each of the three acquire cases, the appropriate files and databases are caused to be updated by the acquire procedure as described earlier. Then, Jacob backs up the parent environment P 186.

Figure 1B:
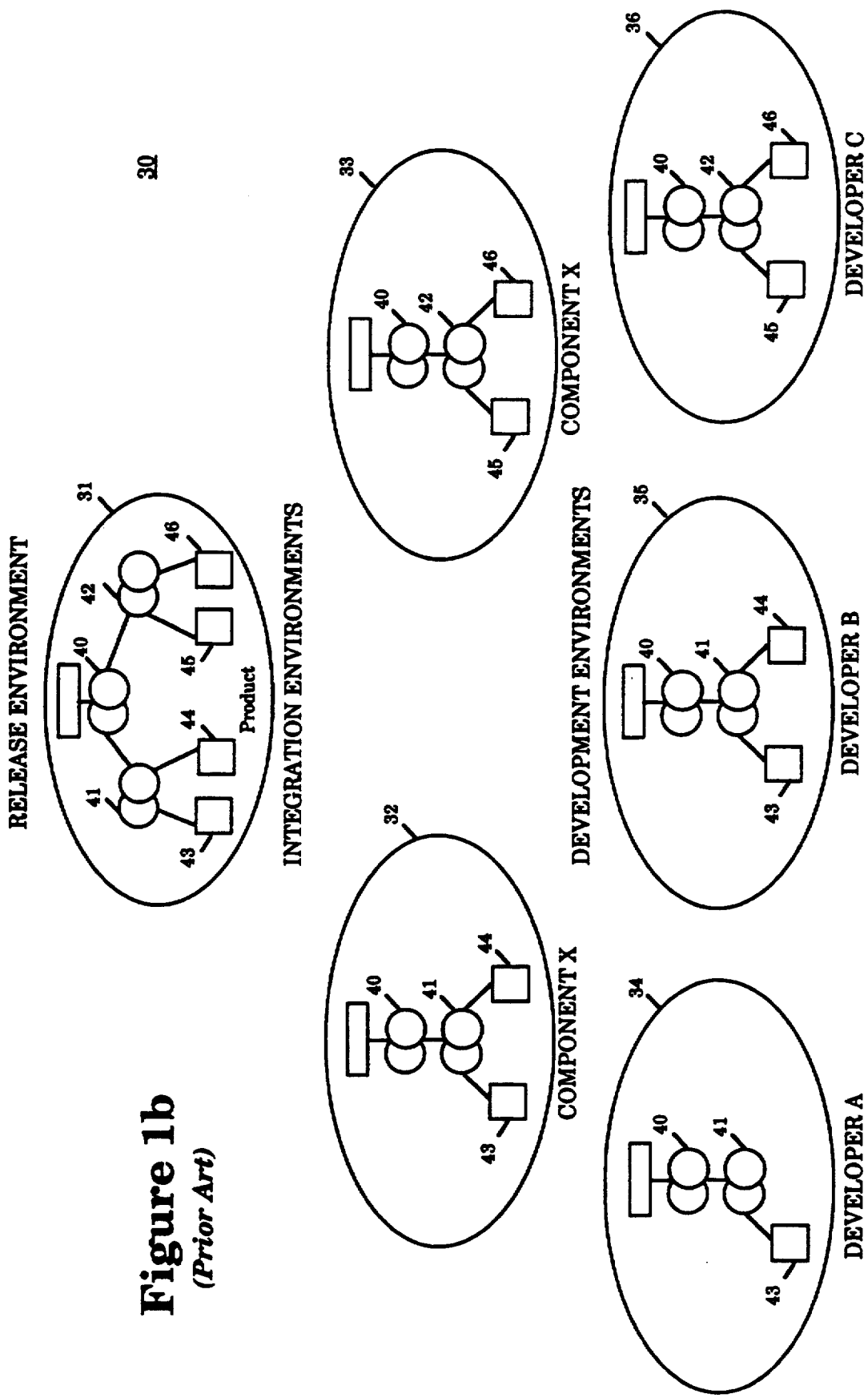
Figure 2:
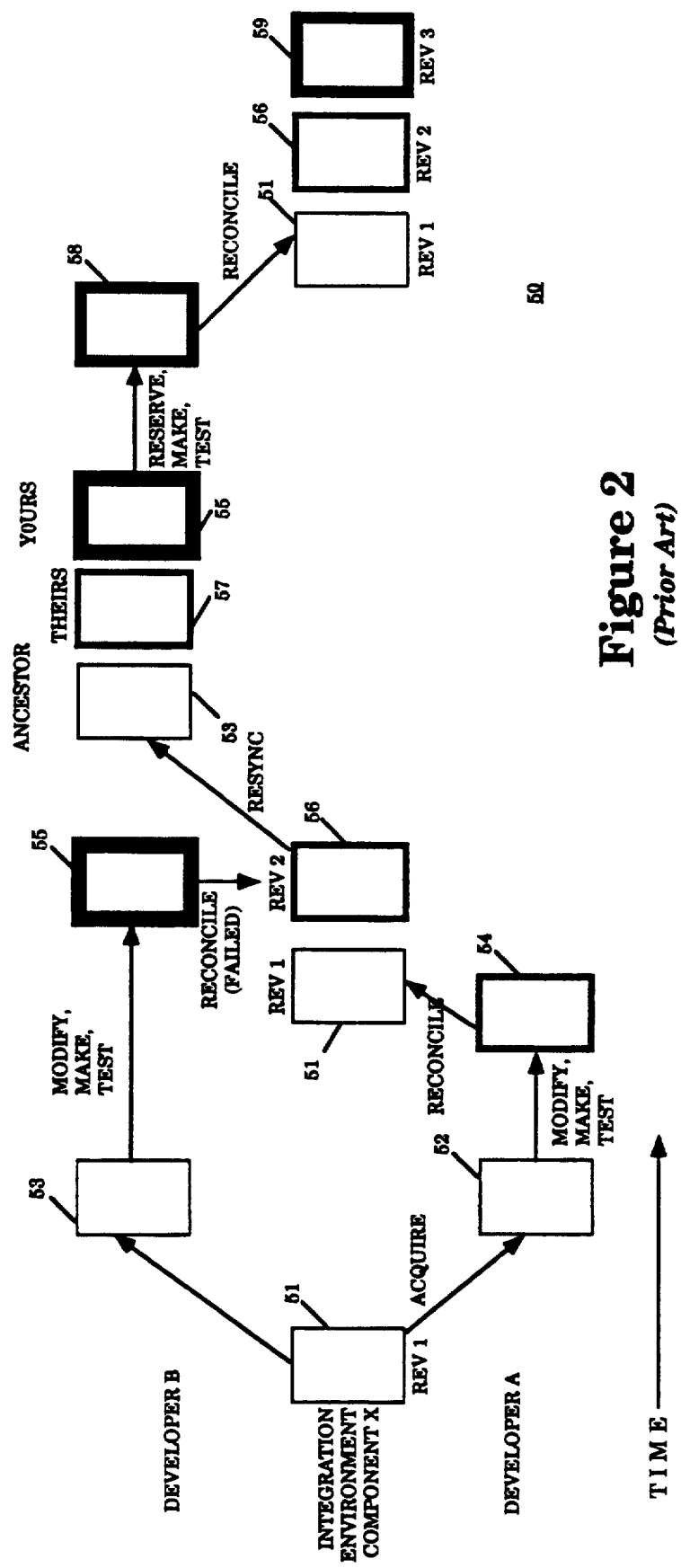
FIG. 2 shows a block diagram illustrating exemplary transactions of the prior art for maintaining consistency across the environments.

Referring now to FIG. 8c-1, 8c-2, after making changes to the object, file "firstfile" (not shown), Alice reconcile the latest revision of the object, component ":a:b", in the parent environment P, to the object, component ":a:b", in the child environment C1 188. The reconcile procedure detects the changes in the object, component ":a:b", in the child environment C1, makes a new revision of the object, component ":a:b", in the parent environment P, and causes the appropriate files and databases to be updated as described earlier.

Then, Betty resynchronizes the object, component ":a:b", in the child environment C2, to the latest revision of the object, component ":a:b", in the parent environment P 191, before doing additional work. By resynchronizing, the object, component ":a:b", in the child environment C2, is updated with the changes made and reconciled by Alice into the object, component ":a:b", in the parent environment P. The appropriate files and databases in the parent and child environments are also caused to be updated by the resync procedure as described earlier. After making changes to the object, file "secondfile" (not shown), Betty reconcile the revision of the object, component ":a:b", in the parent environment P, with the object, component ":a:b", in the child environment C2 192. This time, the reconcile procedure detects the changes in the object, component ":a:b", in the child environment C2, makes another new revision of the object, component ":a:b", in the parent environment P, and causes the appropriate files and databases to be updated as described earlier.

Now, Daniel creates the child environment C4 on his machine "stetson", and acquires all the latest revisions of objects in the parent environment P, thereby, acquiring the latest revisions of the compound objects, components ":a:b", ":a:b", and the simple objects, files "firstfile" and "secondfile", which include the changes made and reconciled by Alice and Betty. The appropriate files and databases in the parent and child environments are caused to be updated by the acquire procedure as described earlier. Then, Charles resynchronizes the object, component ":a:b", in the child environment C3, to the latest revision of the object, component ":a:b", in the parent environment P 196, thereby, also acquiring the changes made and reconciled by Alice and Betty. The appropriate files and databases in the parent and child environments are caused to be updated by the resync procedure as described earlier. At this time, the parent environment P is critically damaged by a system crash requiring it to be restored.

Referring now to FIG. 8d, Jacob first restore the parent environment P to its last back up 198. As a result, the parent environment P and the child environments C1 through C4 are no longer in alignment. The parent environment P no longer has the changes made and reconciled by Alice and Betty, but the child environments C1 and C4 think it does. Furthermore, the parent environment P is not aware of the existence of the child environment C4, since it was created after the last back up.

In order to align the restored parent environment P with the child environments C1 through C4 again, Jacob first identifies the transactions occurred between the parent and the child environments 201 between the time of last back up the parent environment P is restored to and the time the parent environment P was damaged. The identify procedure extracts the logged transaction and sorts them into a chronological order according to their order of execution as described earlier 202. Jacob then proceeds to perform the remedial action for each of the transaction in their order of execution.

Referring now to FIGS. 8e-1, 8e-2, Jacob first activates the child environment C1 and re-reconciles the latest revision of the object, component ":a:b", in the parent environment P, to the object, component ":a:b", in the child environment C1 205. As described earlier, the reconcile procedure detects the conflict in the object, file "firstfile", and requires the conflict to be resolved before re-reconciling the latest revision in the parent environment to the object in the child environment. After resolving the conflict 206, Jacob attempts to re-reconcile again 207. This time, the reconcile procedure makes a new revision of the object, component ":a:b", incorporating the changes made by Alice to the object, file "firstfile", and causes the appropriate files and databases to be updated as described earlier. The parent environment P is now in alignment with the child environment C1.

Jacob then activates the child environment C2 and re-resynchronizes the object, component ":a:b", in the child environment C2, to the latest revision of the object, component ":a:b", in the parent environment P. As a result, the object, component ":a:b", in the child environment C2, is resynchronized to include the changes made and re-reconciled by Alice. The appropriate files and databases are caused to be updated by the resync procedure as described earlier. Jacob then has to go through the similar steps he went through for the child environment C1, to re-reconcile the latest revision of the object, component ":a:b", in the parent environment P, to the object, component ":a:b", in the child environment C2 (not shown). Again, the reconcile procedure detects the conflict in the object, file "secondfile", and requires the conflict to be resolved before re-reconciling the latest revision in the parent environment to the object in the child environment, incorporating the changes made to the object, file "secondfile", by Betty. Now, the parent environment P is aligned with the child environments C1 and C2.

Jacob then deletes the child environment C4 (not shown) and reacquires the latest revision of the objects, component ":a", "a:b" and files "firstfile" and "secondfile", in the parent environment P 210. As a result, the appropriate files and databases are caused to be updated by the acquire procedure as described earlier, thereby, causing the child environment C4 to be known to the parent environment P. Now, the parent environment P is aligned with the child environments C1, C2 and C4.

Lastly, Jacob has to go through similar steps he went through to re-resynchronize the object, component ":a:b", in the child environment C2, to the latest revision of the object, component ":a:b", in the parent environment P, for the object, component ":a:b", in the child environment C3 (not shown). As a result, the object, component ":a:b", in the child environment C3, is resynchronized to include the changes made and re-reconciled by Alice and Betty. Now, the parent environment P is aligned with the child environments C1, C2, C3 and C4.

While the invention has been described in terms of a preferred embodiment, those skilled in the art will recognize that the invention is not limited to the embodiment described herein. The method and apparatus of the present invention can be practiced with modification and alteration within the spirit and scope of the appended claims.

What is claimed is:

1. In a network of computer systems comprising a parent environment and a plurality of child environments, wherein said parent and child environments logically comprise a plurality of objects, a method for aligning said parent environment to said child environments with minimal data loss after restoring said parent environment, said method comprising the steps of:
logging all transactions affecting revisions of objects in said parent environment and their corresponding objects in said child environments when said transactions are executed;
identifying said transactions logged between a first time $t_0$ and a second time $t_1$ where $t_1$ is greater than $t_0$, said parent environment being damaged at said second time $t_1$ and restored to its last back up time which is said first time $t_0$;
sorting said identified transactions into a chronological order in accordance to their time of execution; and
performing repair action for each of said sorted transactions in said chronological order.

2. The method as set forth in claim 1, wherein said transactions, logging, identifying and sorting, are performed by means logically organized as methods of a first class defining a root environment, which is a super class to a second class defining said parent environment, which in turn is a super class to a third and fourth classes defining a first and a second child environment.

3. The method as set forth in claim 1, wherein said transactions are logged in command log files of said child environments.

4. The method as set forth in claim 3, wherein said command log files are logically organized as class instance variables of classes defining said child environments.

5. The method as set forth in claim 1, wherein if a transaction is reconciling a revision of an object in said parent environment to one of its corresponding objects in one of said child environments, said corresponding object affected by said reconciling transaction is repaired by reexecuting said reconcile transaction with said corresponding object, said re-executed reconcile transaction handling said corresponding object in accordance to a plurality of timing parameters extracted for said revision and said corresponding object.

6. The method as set forth in claim 5, wherein said reconcile transaction being re-executed extracts a third and fourth time, $t_3$ and $t_4$, from a directory structure and a transaction database in said child environment of said corresponding object, and a fifth time $t_5$ from a revision database in said parent environment, said corresponding object being last modified in said re-reconciling child environment at said third time $t_3$, said corresponding object being last involved in a transaction between said re-reconciling child environment and said parent environment at said third time $t_4$, and said corresponding object being last revised in said parent environment at said fifth time $t_5$.

7. The method as set forth in claim 6, wherein,
said directory is logically organized as a class directory of a first class defining said child environment of said corresponding object;
said transaction database is logically organized as a first class instance variable of said first class defining said child environment of said corresponding object; and
said revision database is logically organized as a second class instance variable of a second class defining said parent environment, which is a super class to said first class defining said child environment of said corresponding object.

8. The method as set forth in claim 6, wherein if said time $t_3$ equals said time $t_4$ and equals a non-zero value, and said time $t_5$ equals a value zero, said reconcile transaction being reexecuted resets said corresponding object in said child environment of said corresponding object, and updates said parent environment handling said corresponding object as a normal new object being reconciled to in said re-reconciling child environment.

9. The method as set forth in claim 6, wherein if said time $t_3$ equals said time $t_4$ and equals a non-zero value, and said time $t_5$ equals a lesser non-zero value, said reconcile transaction being reexecuted outputs a flag indicating a conflict, and requires said conflict to be resolved before it updates said parent environment handling said corresponding object as a normal old object being reconciled to in said re-reconciling child environment.

10. The method as set forth in claim 6, wherein if said time $t_3$ equals a non-zero value, and said time $t_4$ and time $t_5$ equal a value zero, said reconcile transaction being reexecuted updates said parent environment handling said corresponding object as a normal new object being reconciled to in said re-reconciling child environment.

11. The method as set forth in claim 6, wherein if said time $t_3$ equals a non-zero value, and said time $t_4$ equals time $t_5$ and equal a smaller non-zero value, said reconcile transaction being reexecuted updates said parent environment handling said corresponding object as a normal old object being reconciled to in said re-reconciling child environment.

12. The method as set forth in claim 6, wherein if said time $t_3$ equals said time $t_4$ and time $t_5$, and equals a non-zero value, said reconcile transaction being reexecuted takes no action.

13. The method as set forth in claim 1, wherein if a transaction is resynchronizing an object in one of said child environments to its corresponding revision object in said parent environment, said corresponding revision object affected by said resynchronizing transaction is repaired by reexecuting said resynchronizing transaction, said re-executed resynchronizing transaction handling said corresponding revision object as a normal object being resynchronized from said re-resynchronizing child environment.

14. The method as set forth in claim 1, wherein if a transaction is acquiring a revision of an object from said parent environment into one of said child environments, said acquired object affected by said acquiring transaction is repaired by re-executing said acquiring transaction, said re-executed acquiring transaction handling said revision being reacquired as a normal revision being acquired from said parent environment.

15. The method as set forth in claim 14, wherein if a transaction is acquiring a revision of an object from said parent environment into one of said child environments when said child environment was being created, said acquired object affected by said acquiring transaction is repaired by reexecuting said acquiring transaction after said aquiring child environment is deleted.

16. In a network of computer systems comprising a parent environment and a plurality of child environments, wherein said parent and child environments logically comprise a plurality of objects, an apparatus for aligning said parent environment to said child environments with minimal data loss after restoring said parent environment, comprising:
- transaction means for acquiring a revision of an object from said parent environment into one of said child environments, resynchronizing an object in one of said child environments to a corresponding revision of said object in said parent environment, reconciling a revision of an object in said parent environment to one of its corresponding objects in one of said child environments, said transaction means being invoked by users of said child environments and capable of being re-executed in accordance to their original order of execution for aligning said parent and child environments;
- logging means for logging said transactions when said transactions are executed, said logging means being invoked by said transactions;
- identifying means for identifying said transactions occurred between a first time $t_0$ and second time $t_1$ where $t_1$ is greater than $t_0$, said parent environment being damaged at said second time $t_1$ and restored to its last backed up time which is said first time $t_0$, said identifying means being invoked by a user of said parent environment; and
- sorting means for sorting said identified transactions into a chronological order in accordance to their time of execution, said sorting means being invoked by said identifying means.

17. The apparatus as set forth in claim 16, wherein said transaction means, said logging means, said identifying means, and said sorting means are logically organized as methods of a first class defining a root environment, which is a super class to a second class defining said parent environment, which in turn is a super class to a third and fourth classes defining a first and second child environments.

18. The apparatus as set forth in claim 16, wherein said transactions are logged in command log files of said child environments.

19. The apparatus as set forth in claim 18, wherein said command log files are logically organized as class instance variables of classes defining said child environments.

20. The apparatus as set forth in claim 16, wherein when a reconcile transaction is re-executed to align said parent environment to said child environments, said re-executed reconcile transaction handles said corresponding object being in accordance to a plurality of timing parameters extracted for said revision and said corresponding object.

21. The apparatus as set forth in claim 20, wherein said reconcile transaction being re-executed extracts a third and fourth time, $t_3$ and $t_4$, from a directory structure and a transaction time database in said child environment of said corresponding object, and a fifth time $t_5$ from a revision database in said parent environment, said corresponding object being last modified in said re-reconciling child environment at said third time $t_3$, said corresponding object being last involved in an transaction between said re-reconciling child environment and said parent environment at said third time $t_4$, and said corresponding object being last revised in said parent environment at said fifth time $t_5$.

22. The apparatus as set forth in claim 21, wherein,
- said directory is logically organized as a class directory of a first class defining said child environment of said corresponding object;
- said transaction database is logically organized as a first class instance variable of said first class defining said child environment of said corresponding object; and
- said revision database is logically organized as a second class instance variable of a second class defining said parent environment, which is a super class to said first class defining said child environment of said corresponding object.

23. The apparatus as set forth in claim 21, wherein if said time $t_3$ equals said time $t_4$ and equals a non-zero value, and said time $t_5$ equals a value zero, said reconcile transaction being reexecuted resets said corresponding object in said child environment of said corresponding object, and updates said parent environment handling said corresponding object as a normal new object being reconciled to in said re-reconciling child environment.

24. The apparatus as set forth in claim 21, wherein if said time $t_3$ equals said time $t_4$ and equals a non-zero value, and said time $t_5$ equals a lesser non-zero value, said reconcile transaction being reexecuted outputs a flag indicating a conflict, and requires said conflict to be resolved before it updates said parent environment handling said corresponding object as a normal old object being reconciled to in said re-reconciling child environment.

25. The apparatus as set forth in claim 21, wherein if said time $t_3$ equals a non-zero value, and said time $t_4$ and time $t_5$ equal a value zero, said reconcile transaction being reexecuted updates said parent environment handling said corresponding object as a normal new object being reconciled to in said re-reconciling child environment.

26. The apparatus as set forth in claim 21, wherein if said time $t_3$ equals a non-zero value, and said time $t_4$ equals time $t_5$ which equals a smaller non-zero value, said reconcile transaction being reexecuted updates said parent environment handling said corresponding object as a normal old object being reconciled to in said re-reconciling child environment.

27. The apparatus as set forth in claim 21, wherein if said time $t_3$ equals said time $t_4$ and time $t_5$, and equals a non-zero value, said reconcile transaction being reexecuted takes no action.

28. The apparatus as set forth in claim 16, wherein when a resynchronizing transaction is re-executed for aligning said parent environment to said child environments, said reexecuted resynchronizing transaction handles said object being re-resynchronized as a normal object being resynchronized in said re-resynchronizing child environment.

29. The apparatus as set forth in claim 16, wherein when an acquiring transaction is re-executed for aligning said parent environment to said child environments, said reexecuted acquiring transaction handles said revision being re-acquired as a normal revision being acquired from said parent environment.

30. The apparatus as set forth in claim 29, wherein if said acquiring transaction was executed when said child environment was being created, said acquiring transaction is re-executed after said acquiring child environment is deleted.

* * * * *